United States Patent
Chen et al.

(10) Patent No.: US 10,343,538 B2
(45) Date of Patent: Jul. 9, 2019

(54) CONTROLLING CHARGE LEVELS OF VEHICLE BATTERIES BASED ON BATTERY CHARGE STATES AND VEHICLE OPERATING MODES

(71) Applicant: Ford Global Technologies, LLC, Dearborn, MI (US)

(72) Inventors: Hanyang B. Chen, Canton, MI (US); Michael J. Irby, Monroe, MI (US); Douglas George Rosner, Livonia, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 148 days.

(21) Appl. No.: 15/481,282

(22) Filed: Apr. 6, 2017

(65) Prior Publication Data
US 2018/0290552 A1    Oct. 11, 2018

(51) Int. Cl.
*H01M 10/44* (2006.01)
*H01M 10/46* (2006.01)
*B60L 11/18* (2006.01)
*B60L 1/00* (2006.01)
*B60L 3/04* (2006.01)
(Continued)

(52) U.S. Cl.
CPC ........... *B60L 11/1838* (2013.01); *B60L 1/00* (2013.01); *B60L 3/0046* (2013.01); *B60L 3/04* (2013.01); *B60L 8/003* (2013.01); *B60L 53/30* (2019.02); *B60L 53/51* (2019.02); *B60L 53/60* (2019.02); *B60L 58/12* (2019.02); *B60L 58/13* (2019.02); *B60L 58/15* (2019.02); *H02J 7/0032* (2013.01); *H02J 7/02* (2013.01); *H02J 7/35* (2013.01); *B60L 2240/545* (2013.01); *B60L 2240/547* (2013.01); *B60L 2240/549* (2013.01); *B60L 2260/00* (2013.01); *H02J 2007/004* (2013.01); *H02J 2007/0037* (2013.01); *H02J 2007/0039* (2013.01); *Y02T 10/7005* (2013.01); *Y02T 10/7077* (2013.01)

(58) Field of Classification Search
CPC ... H02J 2007/0037; H02J 7/007; H02J 7/1446
USPC ............... 320/104, 107, 132, 134, 136, 149
See application file for complete search history.

(56) References Cited

U.S. PATENT DOCUMENTS

| 4,638,236 A | 1/1987 | Carr et al. |
| 4,820,965 A | 4/1989 | Sween |

(Continued)

FOREIGN PATENT DOCUMENTS

| DE | 102010045896 A1 | 5/2011 |
| EP | 1993186 A1 | 11/2008 |

OTHER PUBLICATIONS

Search Report dated Sep. 18, 2018 for Great Britain Patent Application No. 1805464.3 (3 Pages).

*Primary Examiner* — Edward Tso
(74) *Attorney, Agent, or Firm* — Frank Lollo; Neal, Gerber & Eisenberg LLP; James P. Muraff (57) ABSTRACT

Method and apparatus are disclosed for controlling charge levels of vehicle batteries. An example vehicle includes a battery, a battery sensor for detecting a current of the battery, a power connector for connecting to an external electrical device, a relay electrically connected between the power connection and the battery, and a body control module to position the relay in a closed state in response to determining that the current is greater than zero and the battery is not in an overcharge state.

20 Claims, 4 Drawing Sheets

(51) Int. Cl.

| | | |
|---|---|---|
| *H02J 7/02* | (2016.01) | |
| *H02J 7/35* | (2006.01) | |
| *B60L 53/30* | (2019.01) | |
| *B60L 53/60* | (2019.01) | |
| *B60L 58/13* | (2019.01) | |
| *B60L 53/51* | (2019.01) | |
| *B60L 3/00* | (2019.01) | |
| *B60L 8/00* | (2006.01) | |
| *H02J 7/00* | (2006.01) | |
| *B60L 58/12* | (2019.01) | |
| *B60L 58/15* | (2019.01) | |

(56) References Cited

U.S. PATENT DOCUMENTS

| | | |
|---|---|---|
| 7,129,598 B2 | 10/2006 | Wagner et al. |
| 8,659,270 B2 | 2/2014 | Hermann et al. |
| 2012/0299529 A1 | 11/2012 | Guo et al. |
| 2013/0127418 A1 | 5/2013 | Oh et al. |
| 2014/0247018 A1* | 9/2014 | Kikuchi ............... H02J 7/0029 320/150 |
| 2016/0325635 A1 | 11/2016 | Masuda et al. |

* cited by examiner

FIG. 4 ably have been exaggerated, so as to emphasize and clearly illustrate the novel features described herein. In addition, system components can be variously arranged, as known in the art. Further, in the drawings, like reference numerals designate corresponding parts throughout the several views.

CONTROLLING CHARGE LEVELS OF VEHICLE BATTERIES BASED ON BATTERY CHARGE STATES AND VEHICLE OPERATING MODES

TECHNICAL FIELD

The present disclosure generally relates to vehicles and, more specifically, to controlling charge levels of vehicle batteries.

BACKGROUND

Typically, vehicles include an engine or motor that propels the vehicle and an energy source that provides energy to the engine or motor to propel the vehicle. For example, gas vehicles include an internal combustion engine that propels the vehicle and consumes gasoline stored in a fuel tank of the vehicle to propel the vehicle. Electric vehicles include an electric motor that propels the vehicle and consumes electric energy stored in one or more batteries of the vehicle to propel the vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for controlling charge levels of vehicle batteries. An example disclosed vehicle includes a battery, a battery sensor for detecting a current of the battery, a power connector for connecting to an external electrical device, a relay electrically connected between the power connection and the battery, and a body control module to position the relay in a closed state in response to determining that the current is greater than zero and the battery is not in an overcharge state.

An example disclosed method for controlling charge levels of vehicle batteries includes detecting a current, a voltage, and a charge level of a battery of an vehicle via a battery sensor. The example method also includes positioning, via a body control module, a relay in a closed state in response to determining that the current is greater than zero and the battery is not in an overcharge state. The relay is electrically connected between a power connection and the battery.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Typically, vehicles include an engine or motor that propels the vehicle and an energy source that provides energy to the engine or motor to propel the vehicle. For example, gas vehicles include an internal combustion engine that propels the vehicle and consumes gasoline stored in a fuel tank of the vehicle to propel the vehicle. Electric vehicles include an electric motor that propels the vehicle and consumes electric energy stored in one or more batteries of the vehicle to propel the vehicle. In some instances, the batteries of vehicles may potentially discharge over time when the vehicle is resting in a key-off state (i.e., when an ignition switch of the vehicle is in an off-position).

Examples disclosed herein include vehicles that monitor characteristics of a battery of the vehicle and operate a relay switch based on the characteristics of the battery to prevent the battery from being drained and/or being overcharged when the vehicle is not being driven.

Example vehicles disclosed herein include a battery, a battery sensor, one or more charging sources, and a relay switch. The battery sensor detect a current, a voltage, a charge level, a temperature, and/or other characteristics of the battery. As used herein, a "charge level" and a "state-of-charge" of a battery refer to a measurement of an amount of energy stored within a battery. The charging source of the vehicle recharges the battery. For example, the one or more charging sources includes a power receptacle that receives and electrically connects to a power plug of a charging station and/or a solar panel that absorbs solar energy to generate electricity. As used herein, a "power receptacle" refers to an electrical connector of a vehicle (e.g., a female connector) that receives another electrical connector (e.g., a power plug, a male connector) electrically connected to an electrical power source (e.g., a charging station) to facilitate recharging of a battery of the vehicle. As used herein, a "power plug" refers to an electrical connector (e.g., a male connector) that is electrically connected to an electrical power source (e.g., a charging station) and is to be received by another electrical connector (e.g., a power receptacle, a female connector) of a vehicle to facilitate recharging of a battery of the vehicle. Further, the relay switch is electrically connected between the battery and the one or more charging sources.

The example vehicles also include a body control module that determines whether to position the relay switch in a closed state or an open state when an ignition switch of the vehicle is in an off-position. As used herein, an "off-position" refers to a position of an ignition switch in which an engine and electronic accessories of a vehicle are inactive. As used herein, a "closed state" of a relay or relay switch refers to a position of the relay or relay switch that forms a closed circuit. For example, the relay switch is positioned in the closed state to facilitate recharging of the battery via one or more of the charging sources. As used herein, an "open state" of a relay or relay switch refers to a position of the relay or relay switch that forms an open circuit. For example, the relay switch is positioned in the open state to deter the battery from being discharged (e.g., via one or more of the charging sources). That is, when the ignition switch of the vehicle is in the off-position, the body control module determines whether to close the relay switch to enable the battery to be recharged or to open the relay switch to prevent the battery from being discharged.

To determine which state to position the relay switch, the body control module monitors data collected from the battery sensor (e.g., the current, the voltage, the charge level, the temperature, etc. of the battery) and/or a vehicle operating mode of the vehicle. For example, when the vehicle is in a sleep mode, the body control module activates at predetermined time intervals (e.g., every 5 minutes) to monitor the battery of the vehicle. As used herein, a "sleep mode" refers to a setting of a vehicle in which energy consumption of electronic control units of the vehicle are reduced to a minimal operating level to reduce energy consumption while the vehicle is not being operated. As used herein, an "active mode" refers to a setting of a vehicle in electronic control units are fully functional.

The body control module of the example vehicles disclosed herein positions the relay switch in the closed state in response to determining that (i) the current of the battery is greater than zero and (ii) the battery is not in an overcharge state. For example, the battery sensor detects that the current of the battery is greater than zero when current is flowing into the battery to recharge the battery. In contrast, the battery sensor detects that the current of the battery is less than zero when current is being discharged from the battery. As used herein, an "overcharge state" refers to a state of a battery (e.g., a battery of an vehicle) in which the battery is fully charged and potentially may overheat if the battery continues to be charged. For example, the body control module determines that the battery is in an overcharge state when the battery sensor detects that (i) the charge level of the battery is greater than an upper vehicle charge threshold (e.g., 98%) and (ii) the voltage of the battery is greater than an upper vehicle voltage threshold (e.g, 13.6 Volts). In response to determining that the battery is in an overcharge state, the body control module of the examples disclosed herein positions the relay switch in the open state to prevent the battery from being charged by a charging source.

Additionally or alternatively, the body control module positions the relay in the closed state in response to determining that the vehicle operating mode is the active mode. In some examples, the body control module positions the relay in the open state in response to determining that the vehicle is in the sleep mode for greater than or equal to a predetermined time threshold (e.g., 75 minutes). In some examples, the body control module positions the relay in the closed position in response to determining that (i) the vehicle is in the sleep mode for less than the predetermined time threshold and (ii) the charge level of the battery is greater than a lower vehicle charge threshold (e.g., 60%). Further, the body control module may position the relay in the open position in response to determining that (i) the current is less than zero, (ii) the charge level is less than the lower vehicle charge threshold, and (iii) the voltage of the battery is less than a lower vehicle voltage threshold (e.g., 11.5 Volts). For example, the battery is in an undercharge state when the charge level is less than the lower vehicle charge threshold and the is less than the lower vehicle voltage threshold.

Figure 1:
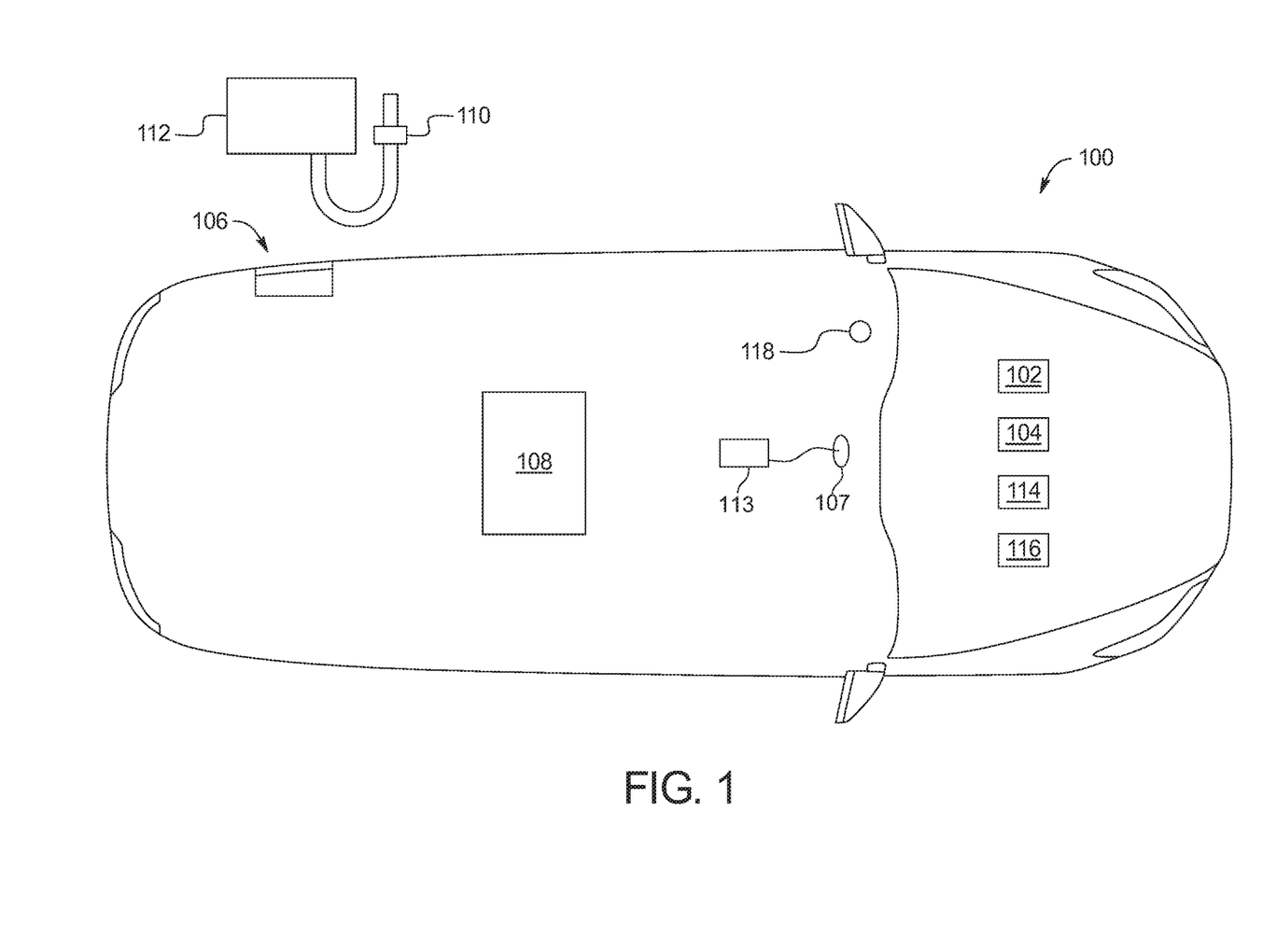
FIG. 1 illustrates an example vehicle in accordance with the teachings herein.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input).

In the illustrated example, the vehicle 100 includes an engine 102, a battery 104, a power receptacle 106, a power connection 107, and a solar panel 108. The engine 102 includes an internal combustion engine, an electric motor, and/or any other power source that propels movement of the vehicle 100. In some examples, the battery 104 is a starter battery that provides energy to an internal combustion engine of the engine 102 to activate the internal combustion engine. Once activated, power is supplied to the internal combustion engine via an alternator. In some examples, the battery 104 is electrically connected to an electric motor of the engine 102 and provides electricity to the electric motor to enable the electric motor to propel the vehicle 100. In such examples, the battery 104 may include a single battery cell and/or a battery pack that includes a plurality of battery cells connected together.

Further, the battery 104 of the illustrated example is electrically rechargeable via the power receptacle 106, the power connection 107 the solar panel 108, and/or any other charging source of the vehicle 100 to facilitate continued operation of the vehicle 100. For example, the power receptacle 106 of the vehicle 100 receives a power plug 110 of a charging station 112 for recharging the battery 104. When the power plug 110 is connected to the power receptacle 106, the charging station 112 is capable of providing electricity and, thus, recharging the battery 104. The vehicle 100 of the illustrated example also includes the solar panel 108 that is electrically connected to the battery 104 for recharging the battery 104. The power connection 107 is an electrical socket that receives a plug to connect to an external electrical device 113. For example, the power connection is a 12 Volt socket located on a center console of the vehicle 100. Further, the power connection 107 is electrically connected to the battery 104 of the vehicle 100. In some examples, the external electrical device 113 is a mobile device (e.g., a smart phone, a smart watch, a wearable, a tablet, etc.) that draws from the battery 104 when connected to the power connection 107. In some examples, the external electrical device 113 is a power source (e.g., a portable battery charger) that recharges the battery 104 when connected to the power connection 107. Additionally, the solar panel 108 captures solar energy (e.g., via sunlight), transforms the solar energy into electricity, and recharges the battery 104 by providing the electricity to the battery 104.

As illustrated in FIG. 1, the vehicle 100 includes a battery sensor 114 (e.g., of a battery management system 302 of FIG. 3) that monitors characteristics of the battery 104. The battery sensor 114 detects and/or otherwise determines a current, a voltage, a charge level, and/or a temperature of the battery 104. For example, the battery sensor 114 detects that the current of the battery 104 is greater than 0 Amps when the battery 104 is being recharged and detects that the current of the battery 104 is less than 0 Amps when the battery 104 is being discharged. In some examples, the battery sensor 114 is attached to a lead (e.g., a positive lead 204 of FIG. 2) of the battery 104 to enable the battery sensor 114 to monitor the characteristics of the battery 104.

Further, the vehicle 100 includes a body control module 116 and an ignition switch 118. The body control module 116 controls one or more subsystems throughout the vehicle 100, such as power windows, power locks, an immobilizer system, power mirrors, etc. For example, the body control module 116 includes circuits that drive one or more of relays (e.g., to control wiper fluid, etc.), brushed direct current (DC) motors (e.g., to control power seats, power locks, power windows, wipers, etc.), stepper motors, LEDs, etc.

The body control module 116 of the illustrated example controls charging and discharging of the battery 104 when the ignition switch 118 is in an off-position. For example, when the ignition switch 118 is in the off-position, the body control module 116 operates a relay (e.g., a relay 202 of FIG. 2) that is electrically connected between the battery 104 and the one or more charging sources (e.g., the power receptacle 106, the solar panel 108) of the vehicle 100. The body control module 116 operates the relay to enable the battery 104 to be recharged when an energy source (e.g., power receptacle 106, the solar panel 108, etc.) is providing electricity and/or to prevent the battery 104 from discharging when the battery 104 is not being recharged. The body control module 116 monitors a position of the ignition switch 118, an operating mode (e.g., an active mode, a sleep mode, etc.) of the vehicle 100, and battery data (e.g., a current, a voltage, a charge level, a temperature, etc.) collected via the battery sensor 114 to determine whether to enable recharging and/or deter discharging of the battery 104 via the relay. For example, the vehicle 100 is in an active mode when the ignition switch 118 is in an on-position, when the ignition switch 118 is in an accessory-position, and/or when the ignition switch 118 is in the off-position and an electronic control unit (e.g., the body control module 116) has been triggered to perform a function (e.g., when a vehicle door is unlocked and/or opened). Further, the vehicle 100 is in a sleep mode when the ignition switch 118 is in the off-position for a predetermined period of time to reduce an amount of energy being consumed by the electronic control units of the vehicle 100.

Figure 2:
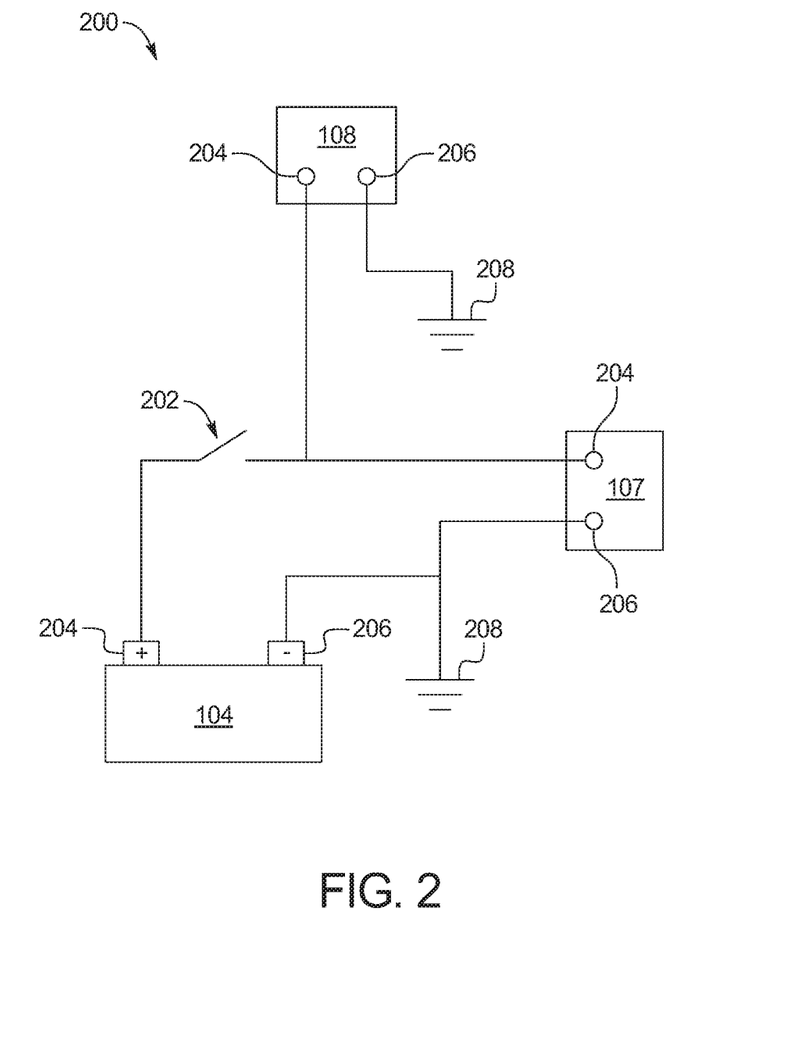
FIG. 2 depicts an example circuit for controlling a charge level of a battery of the vehicle of FIG. 1.

FIG. 2 depicts an example circuit 200 for controlling the charge level of the battery 104 of the vehicle 100. As illustrated in FIG. 2, the circuit includes the battery 104, the power connection 107, the solar panel 108, and a relay 202. The relay 202 is electrically connected between the battery 104 and the power connection 107. Further, the relay 202 is electrically connected between the battery 104 and the solar panel 108 such that the solar panel 108 is electrically connected to the relay 202 in parallel to the power receptacle 106. Additionally or alternatively, the relay 202 is electrically connected between the battery 104 and the power receptacle 106 such that the power receptacle 106 is electrically connected to the relay 202 in parallel to the power connection 107 and/or the solar panel 108. In the illustrated example, each of the battery 104, the power connection 107, and the solar panel 108 includes a positive lead 204 and a negative lead 206. The positive lead 204 of each of the battery 104, the power connection 107, and the solar panel 108 is connected to the relay 202. Further, the negative lead 206 of each of the battery 104, the power connection 107, and the solar panel 108 is connected to ground 208.

The relay 202 of the illustrated is communicatively connected to and controlled by the body control module 116. The body control module 116 transitions the relay 202 between an open state (as illustrated in FIG. 2) in which the battery 104 is electrically connected to the power connection 107 and/or the solar panel 108 and a closed state in which the battery 104 is electrically disconnected from the power connection 107 and/or the solar panel 108.

The body control module 116 monitors data collected from the battery sensor 114 (e.g., the current, the voltage, the charge level, the temperature, etc. of the battery 104) and/or the vehicle operating mode of the vehicle 100 to determine in which state to position the relay 202. For example, the body control module 116 monitors the data collected from the battery sensor 114 when the vehicle 100 is in the active mode. Additionally, when the vehicle 100 is in the sleep mode, the body control module 116 temporarily activates (e.g., for a short predetermined period of time) at predetermined time intervals (e.g., every 5 minutes) to monitor the data collected from the battery sensor 114. For example, to monitor the battery sensor 114, the body control module 116 temporarily positions (e.g., for a short predetermined period of time) the relay 202 in the closed state to enable the battery sensor 114 to detect and/or otherwise determine a current value of the current, the charge level, the voltage, and/or the temperature of the battery 104.

The body control module 116 positions the relay 202 in the closed state to enable the power connection 107 and/or the solar panel 108 to electrically connect to the battery 104, for example, to recharge the battery 104. For example, the body control module 116 positions the relay 202 in the closed state in response to determining that the ignition switch 118 of the vehicle 100 is in an on-position or an accessory-position and/or that the vehicle operating mode of the vehicle 100 is the active mode. The body control module 116 positions the relay 202 in the closed state in response to determining that (i) the vehicle 100 is in the sleep mode for less than a predetermined time threshold (e.g., 75 minutes) and (ii) the charge level of the battery 104 is greater than a lower vehicle charge threshold (e.g., 60%). To determine the sleep mode duration of the vehicle 100, the body control module 116 tolls (i.e., suspends) the sleep mode duration for the time intervals during which the body control module 116 temporarily activates to monitor the battery 104 such that the sleep mode duration is not reset to zero each time the body control module 116 is temporarily activated to monitor the battery 104. Additionally, the body control module 116 positions the relay 202 in the closed state in response to determining that (i) the current is less than zero and (ii) the charge level of the battery 104 is greater than a lower vehicle charge threshold or the voltage of the battery 104 is less than a lower vehicle voltage threshold (e.g., 11.5 Volts) (e.g., the battery 104 is in an undercharged state). Further, the body control module 116 positions the relay 202 in the closed state in response to determining that (i) the current of the battery 104 is greater than zero (i.e., the battery 104 is being recharged) and (ii) the battery 104 is not in an overcharge state. For example, the body control module 116 determines that the battery 104 is in the overcharge state when (i) the charge level of the battery 104 is greater than an upper vehicle charge threshold (e.g., 98%) and (ii) the voltage of the battery 104 is greater than an upper vehicle voltage threshold (e.g, 13.6 Volts).

Further, the body control module 116 positions the relay 202 in the open state to prevent the battery 104 from being discharged through a charging source (e.g., the power receptacle 106, the solar panel 108) and/or to prevent the battery 104 from being overcharged. For example, the body control module 116 positions the relay 202 in the open state to prevent the battery 104 from being overcharged in response to determining that the battery is in the overcharge state. The body control module 116 positions the relay 202 in the open state to prevent the battery 104 from being discharged in response to determining that the vehicle 100 is in the sleep mode for greater than or equal to the predetermined time threshold and/or in response to determining that (i) the current of the battery 104 is less than or equal to zero (i.e., the battery 104 is discharging), (ii) the charge level of the battery 104 is less than the lower vehicle charge threshold, and (iii) the voltage of the battery 104 is less than a lower vehicle voltage threshold (e.g., 11.5 Volts) (e.g., the battery 104 is in the undercharged state).

Figure 3:
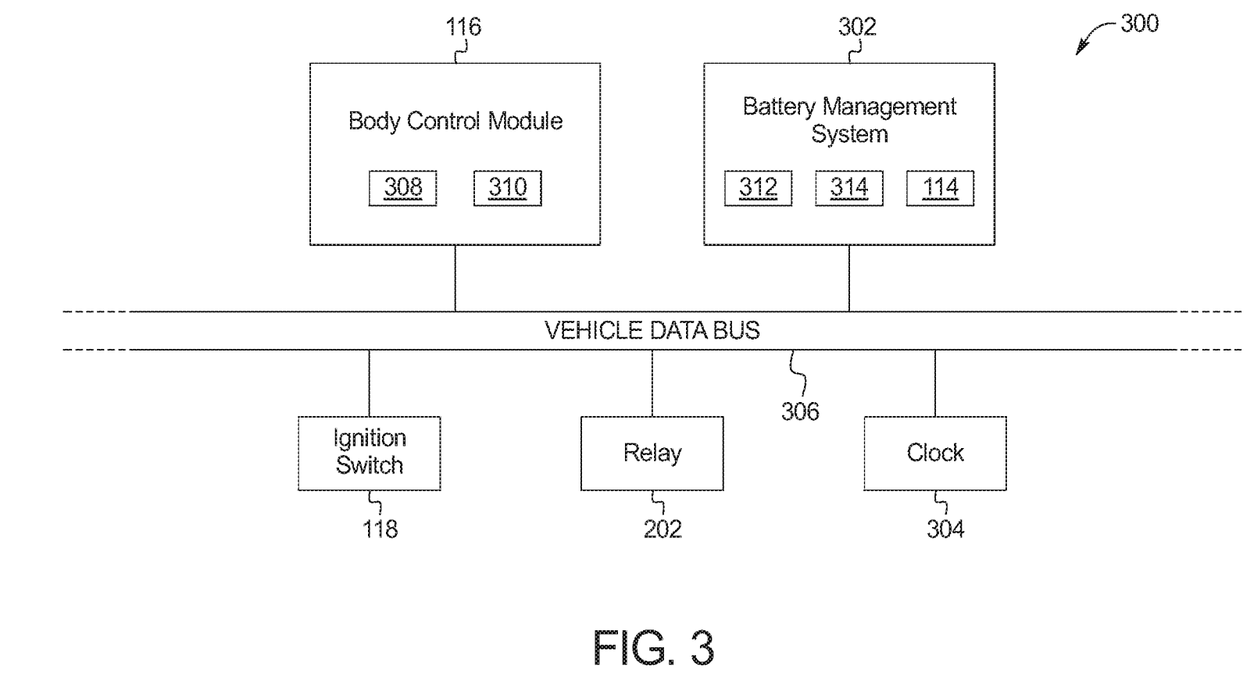
FIG. 3 is a block diagram of electronic components of the vehicle of FIG. 1.

FIG. 3 is a block diagram of electronic components 300 of the vehicle 100. As illustrated in FIG. 3, the electronic components include the body control module 116, a battery management system 302, the ignition switch 118, the relay 202, a clock 304, and a vehicle data bus 306.

The body control module 116 includes a microcontroller unit, controller or processor 308 and memory 310. The processor 308 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 310 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 310 includes multiple kinds of memory, particularly volatile memory and non-volatile memory.

The memory 310 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 310, the computer readable medium, and/or within the processor 308 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The battery management system 302 includes a microcontroller unit, controller or processor 312; memory 314; and the battery sensor 114 that monitors characteristics (e.g., the current, the voltage, the charge level, the temperature, etc.) of the battery 104. The processor 312 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 314 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 314 includes multiple kinds of memory, particularly volatile memory and non-volatile memory.

The memory 314 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 314, the computer readable medium, and/or within the processor 312 during execution of the instructions.

The body control module 116 and the battery management system 302 are electronic control units (ECUs) of the vehicle 100. ECUs (e.g., the body control module 116, the battery management system 302, etc.) monitor and control subsystems of the vehicle 100. For example, the ECUs are discrete sets of electronics that include their own circuit(s) (e.g., integrated circuits, microprocessors, memory, storage, etc.) and firmware, sensors, actuators, and/or mounting hardware. The ECUs communicate and exchange information via a vehicle data bus (e.g., the vehicle data bus 306). Additionally, the ECUs may communicate properties (e.g., status of the ECUs, sensor readings, control state, error and diagnostic codes, etc.) to and/or receive requests from each other. For example, the vehicle 100 may have seventy or more of the ECUs that are positioned in various locations around the vehicle 100 and are communicatively coupled by the vehicle data bus 306.

In the illustrated example, the ignition switch 118 is monitored by the body control module 116 to detect when the ignition switch is in the off-position. The relay 202 is controlled by the body control module 116 to enable charging and/or to deter discharging of the battery 104. For example, the relay is positioned in the closed state to facilitate charging of the battery 104 and is positioned in the open state prevent the battery 104 from being discharged. Further, the clock 304 monitors time, for example, to enable the body control module 116 to determine a duration during which the vehicle 100 has been in a sleep mode, a duration since the battery sensor 114 last obtained measurements from the battery 104, etc.

The vehicle data bus 306 communicatively couples the body control module 116, the ignition switch 118, the relay 202, the battery management system 302, and the clock 304. In some examples, the vehicle data bus 306 includes one or more data buses. The vehicle data bus 306 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 4:
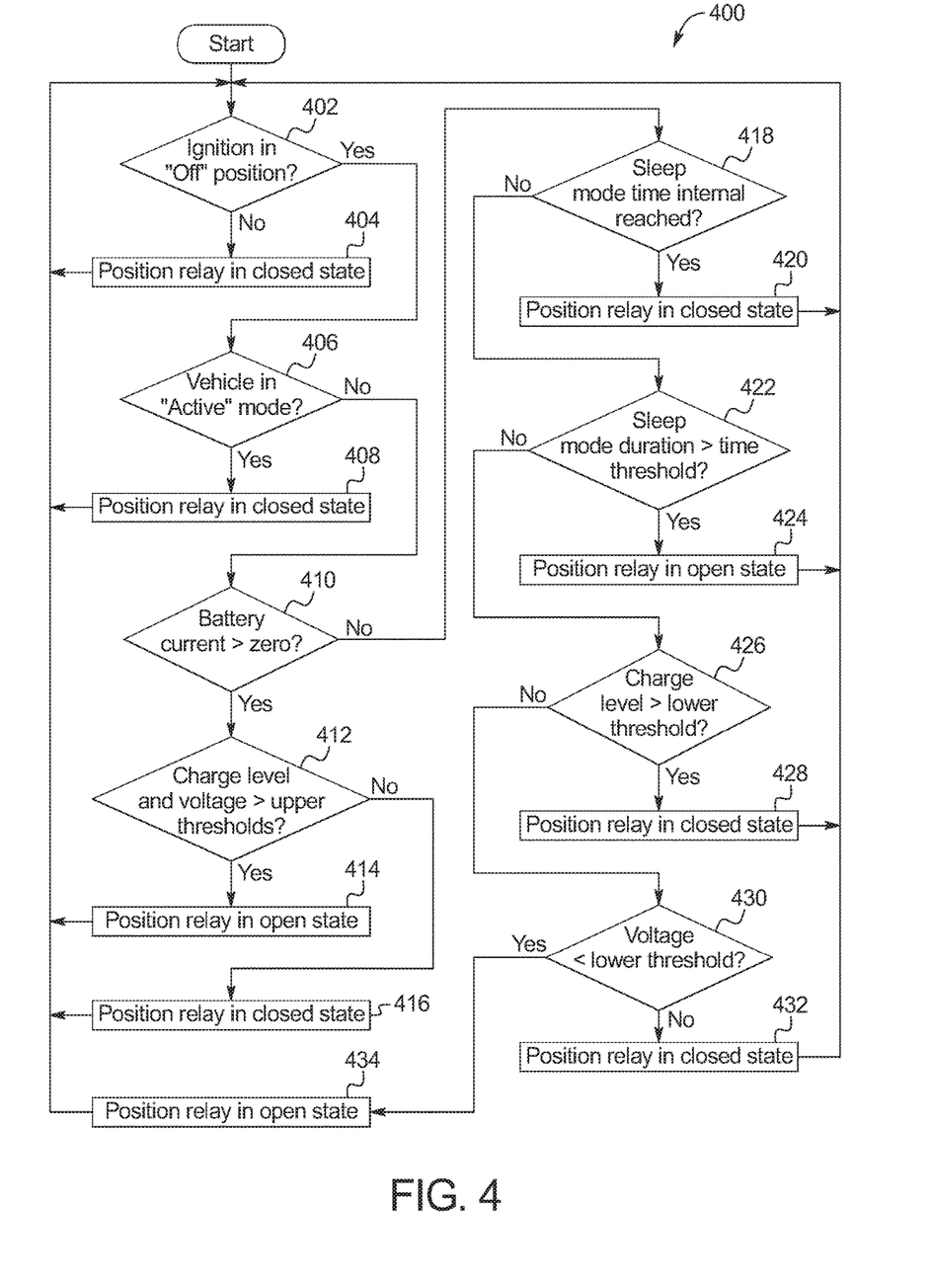
FIG. 4 is a flowchart for controlling a charge level of a battery of the vehicle of FIG. 1 in accordance with the teachings herein.

FIG. 4 is a flowchart of an example method 400 to control a charge level of a battery of a vehicle. The flowchart of FIG. 4 is representative of machine readable instructions that are stored in memory (such as the memory 310 and/or the memory 314 of FIG. 3) and include one or more programs which, when executed by a processor (such as the processor 308 and/or the processor 312 of FIG. 3), cause the vehicle 100 to implement the example body control module 116 of FIGS. 1 and 3 and/or the example battery management system 302 of FIG. 3. While the example program is described with reference to the flowchart illustrated in FIG. 4, many other methods of implementing the example body control module 116 and/or the example battery management system 302 may alternatively be used. For example, the order of execution of the blocks may be rearranged, changed, eliminated, and/or combined to perform the method 400. Further, because the method 400 is disclosed in connection with the components of FIGS. 1-3, some functions of those components will not be described in detail below.

Initially, at block 402, the body control module 116 determines whether the ignition switch 118 is in the off-position. In response to determining that the ignition switch 118 is not in the off-position (e.g., the ignition switch 118 is in the on-position or the accessory-position), the body control module 116 positions the relay 202 in the closed state (block 404). Otherwise, in response to determining that the ignition switch 118 is in the off-position, the method 400 proceeds to block 406 at which the body control module 116 determines whether the vehicle operating mode of the vehicle 100 is the active mode. In response to determining that the vehicle 100 is in the active mode, the body control module 116 positions the relay 202 in the closed state (block 408). Otherwise, in response to determining that vehicle 100 is not in the active mode (i.e., the vehicle 100 is in the sleep mode), the method 400 proceeds to block 410 at which the body control module 116 determines whether the current of the battery 104 is greater than zero. That is, at block 410, the body control module 116 determines whether the battery 104 is being recharged.

In response to determining that the current of the battery 104 is greater than zero, the method 400 proceeds to block 412 at which the body control module 116 determines whether the charge level of the battery 104 is greater than an upper vehicle charge threshold (e.g., 98%) and the voltage of the battery 104 is greater than an upper vehicle voltage threshold (e.g, 13.6 Volts). In response to determining that both the charge level and the voltage are greater than their respective upper thresholds, the body control module 116 positions the relay 202 in the open state (block 414). That is, the body control module 116 positions the relay 202 in the open state when the battery 104 has a current greater than zero, a voltage greater than its upper threshold, and a charge level greater than its upper threshold to prevent the battery 104 from being overcharged. Further, in response to determining that the charge level is not greater than its upper threshold and/or the voltage is not greater than its upper threshold, the body control module 116 positions the relay 202 in the closed state (block 416).

Further, in response to determining at block 410 that the current of the battery 104 is equal to zero, the body control module 116 retain the position of the relay 202 in its current state (e.g., the closed state or the open state). Otherwise, in response to determining at block 410 that the current of the battery 104 is less than zero, the method 400 proceeds to block 418 at which the body control module 116 determines whether the vehicle 100 has been in the sleep mode for a predetermined time interval (e.g., 5 minutes). In response to determining that the sleep mode time interval has been reached, the body control module 116 temporarily positions (e.g., for a short predetermined period of time) the relay 202 in the closed state to enable the battery sensor 114 to detect and/or otherwise determine a current value of the current, the charge level, the voltage, and/or the temperature of the battery 104 (block 420). That is, the body control module 116 temporarily positions the relay 202 in the closed state at the predetermined sleep mode time intervals.

Otherwise, in response to determining that the sleep mode time interval has not been reached, the method 400 proceeds to block 422 at which the body control module 116 determines whether the vehicle 100 has been in the sleep mode for a predetermined time threshold (e.g., 75 minutes). For example, to determine the sleep mode duration of the vehicle 100, the body control module 116 tolls (i.e., suspends) the sleep mode duration for the time intervals during which the body control module 116 temporarily activates to monitor the battery 104 such that the sleep mode duration is not reset to zero each time the body control module 116 is temporarily activated to monitor the battery 104. In response to determining the vehicle 100 has been in the sleep mode for a duration greater than predetermined time threshold, the body control module 116 positions the relay 202 in the open state (block 424). That is, the body control module 116 temporarily positions the relay 202 in open state when the vehicle 100 has been in the sleep mode for a period longer than the predetermined time threshold.

Otherwise, in response to determining that the vehicle 100 has not been in the sleep mode for a duration greater than predetermined time threshold, the method 400 proceeds to block 426 at which the body control module 116 determines whether the charge level of the battery 104 is greater than a lower vehicle charge threshold (e.g., 60%). In response to determining that the charge level of the battery 104 is greater than the lower vehicle charge threshold, the body control module 116 positions the relay 202 in the closed state (block 428). That is, the body control module 116 positions the relay 202 in the closed state when the vehicle 100 has been in the sleep mode for less than the predetermined time threshold and the charge level of the battery 104 is greater than or equal to the lower vehicle charge threshold. Otherwise, in response to determining that the charge level of the battery 104 is not greater than the lower vehicle charge threshold, the method 400 proceeds to block 430.

At block 430, the body control module 116 determines whether the voltage of the battery 104 is less than a lower vehicle voltage threshold (e.g., 11.5 Volts). In response to determining that the voltage of the battery 104 is not less than the lower vehicle voltage threshold, the body control module 116 positions the relay 202 in the closed state (block 432). Otherwise, in response to determining that the voltage of the battery 104 is less than the lower vehicle voltage threshold, the body control module 116 positions the relay 202 in the open state (block 434). That is, the body control module 116 positions the relay 202 in the open state when the current of the battery 104 is less than or equal to zero, the charge level of the battery 104 is less than the lower vehicle charge threshold, and the voltage of the battery 104 is less than the lower vehicle voltage threshold.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes,"

"including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a battery;
   a battery sensor for detecting a current of the battery;
   a power connector for connecting to an external electrical device;
   a relay electrically connected between the power connector and the battery; and
   a body control module to:
     position the relay in a closed state in response to determining that the current is greater than zero and the battery is not in an overcharge state;
     determine a vehicle operating mode; and
     position the relay in the closed state in response to determining the vehicle operating mode is an active mode.

2. The vehicle of claim 1, wherein the external electrical device is at least one of a mobile device that draws from the battery and a power source that recharges the battery.

3. The vehicle of claim 1, further including a charging source for recharging the battery, the charging source is electrically connected to the relay in parallel to the power connector, the charging source includes at least one of a power receptacle and a solar panel.

4. The vehicle of claim 1, wherein the current is greater than zero when the battery is being recharged and the current is less than zero when the battery is being discharged.

5. The vehicle of claim 1, wherein the battery sensor detects a current and a voltage to determine a charge level of the battery.

6. The vehicle of claim 5, wherein the body control module determines the battery is in the overcharge state when the charge level is greater than an upper vehicle charge threshold and the voltage is greater than an upper vehicle voltage threshold.

7. The vehicle of claim 6, wherein the body control module positions the relay in an open state in response to determining the current is greater than zero and the battery is in the overcharge state.

8. A vehicle comprising:
   a battery;
   a battery sensor for detecting a current of the battery;
   a power connector for connecting to an external electrical device;
   a relay electrically connected between the power connector and the battery; and
   a body control module to position the relay in a closed state in response to determining that the current is greater than zero and the battery is not in an overcharge state, wherein, when an ignition is in an off-position, the body control module positions the relay in the closed state to facilitate recharging of the battery and positions the relay in an open state to prevent discharging of the battery.

9. The vehicle of claim 8, wherein the body control module determines a vehicle operating mode.

10. A vehicle comprising:
    a battery having a current
    a power connector for an external device;
    a relay electrically connected between the power connector and the battery; and
    a body control module to:
      close the relay in response to determining the current is greater than zero and the battery is not in an overcharge state; and
      open the relay in response to determining the vehicle is in a sleep mode for at least a predetermined duration.

11. The vehicle of claim 10, wherein the body control module positions the relay in the closed state in response to determining the vehicle is in an active mode.

12. The vehicle of claim 10, wherein the body control module closes the relay in response to determining the current is less than zero and at least one of a charge level is greater than a lower vehicle charge threshold and a voltage of the battery is greater than a lower vehicle voltage threshold.

13. The vehicle of claim 10, wherein the body control module opens the relay in response to determining the current is less than zero, a charge level is less than a lower vehicle charge threshold, and a voltage of the battery is less than a lower vehicle voltage threshold.

14. A method for controlling charge levels of vehicle batteries, the method comprising:
    detecting a current, a voltage, and a charge level of a battery of a vehicle via a battery sensor;
    activating, when the vehicle is in a sleep mode, a body control module at predetermined time intervals to monitor the battery; and
    positioning, via the body control module, a relay in a closed state in response to determining that the current is greater than zero and the battery is not in an overcharge state, the relay electrically connected between a power connection and the battery.

15. The method of claim 14, wherein the relay is electrically connected between a charging source parallel to the power connection, the charging source is at least one of a power receptacle and a solar panel.

16. The method of claim 14, further including positioning, via the body control module, the relay in an open state in response to the body control module determining the battery is in the overcharge state, the battery is in the overcharge state when the charge level is greater than an upper vehicle charge threshold and the voltage is greater than an upper vehicle voltage threshold.

17. The method of claim 14, wherein the power connection is to connect to an external electrical device, the external electrical device is at least one of a mobile device that draws from the battery and a power source that recharges the battery.

18. A method for controlling charge levels of vehicle batteries, the method comprising:
    detecting a current, a voltage, and a charge level of a battery of a vehicle via a battery sensor;
    positioning, via a body control module, a relay in a closed state in response to determining that the current is greater than zero and the battery is not in an overcharge state, the relay electrically connected between a power connection and the battery; and
    positioning, via the body control module, the relay in an open state in response to the body control module determining the vehicle is in a sleep mode for greater than or equal to a predetermined time threshold.

19. The method of claim 18, wherein, when the vehicle is in the sleep mode, the body control module activates at predetermined time intervals to monitor the battery.

20. The method of claim 18, further including positioning, via the body control module, the relay in the closed state in response to the body control module determining the vehicle is in the sleep mode for less than the predetermined time threshold and the charge level is greater than a lower vehicle charge threshold.

* * * * *